United States Patent [19]

Williams et al.

[11] Patent Number: 4,880,999
[45] Date of Patent: Nov. 14, 1989

[54] SOLENOID

[75] Inventors: Robert A. Williams, Fort Worth; Jeffrey W. Herron, Arlington, both of Tex.

[73] Assignee: Williams Instruments, Inc., Fort Worth, Tex.

[21] Appl. No.: 319,665

[22] Filed: Mar. 7, 1989

[51] Int. Cl.$^4$ .............................................. H02K 33/00
[52] U.S. Cl. ....................................... 310/37; 335/272; 335/279
[58] Field of Search ................ 335/270, 272, 279, 281; 310/37

[56] References Cited

U.S. PATENT DOCUMENTS

| | | | |
|---|---|---|---|
| 2,825,826 | 3/1958 | Sundt | 310/37 |
| 3,164,732 | 1/1965 | Molitor | 335/272 X |
| 3,278,818 | 10/1966 | Winestock | 310/37 X |
| 3,827,543 | 8/1974 | Kawando et al. | 335/272 X |

Primary Examiner—George Harris
Attorney, Agent, or Firm—Arthur F. Zobal; Geoff Mantooth

[57] ABSTRACT

A solenoid has a coil with an outer core and an inner core. The cores provide the magnetic circuit around the coil. The inner core includes a rotor which has radially extending armatures. The armatures are positioned in gaps between radially extending poles of the outer core so as to form air gaps between the poles and the armatures. When the coil is energized, the armatures are attracted to the poles and cause the rotor to rotate, thereby closing the air gaps. The shaft is coupled to the rotor through a drive mechanism so as to rotate with the rotor. The shaft is made of a material with a relatively high magnetic permeability, as are the inner and outer cores, so that the shaft is magnetically coupled to the inner core rotor. When the rotor stops rotating, the shaft also stops. A return spring returns the rotor to its deenergized position when the coil is deenergized, recreating the air gaps. The drive mechanism allows the shaft to remain stationary while the rotors return to the deenergized position.

15 Claims, 5 Drawing Sheets

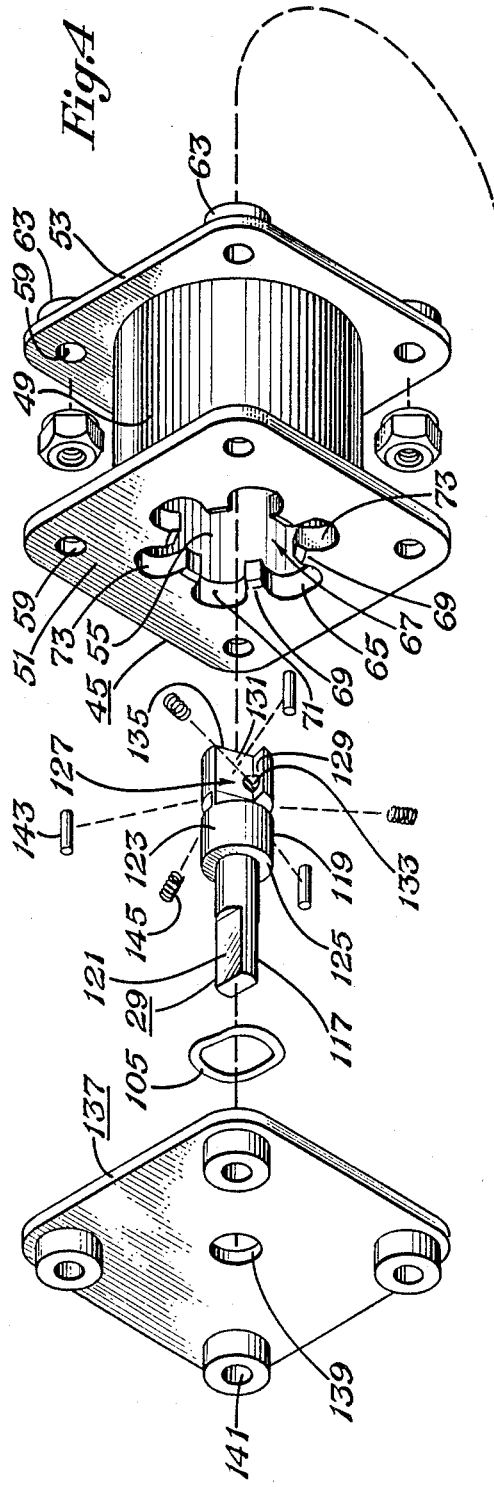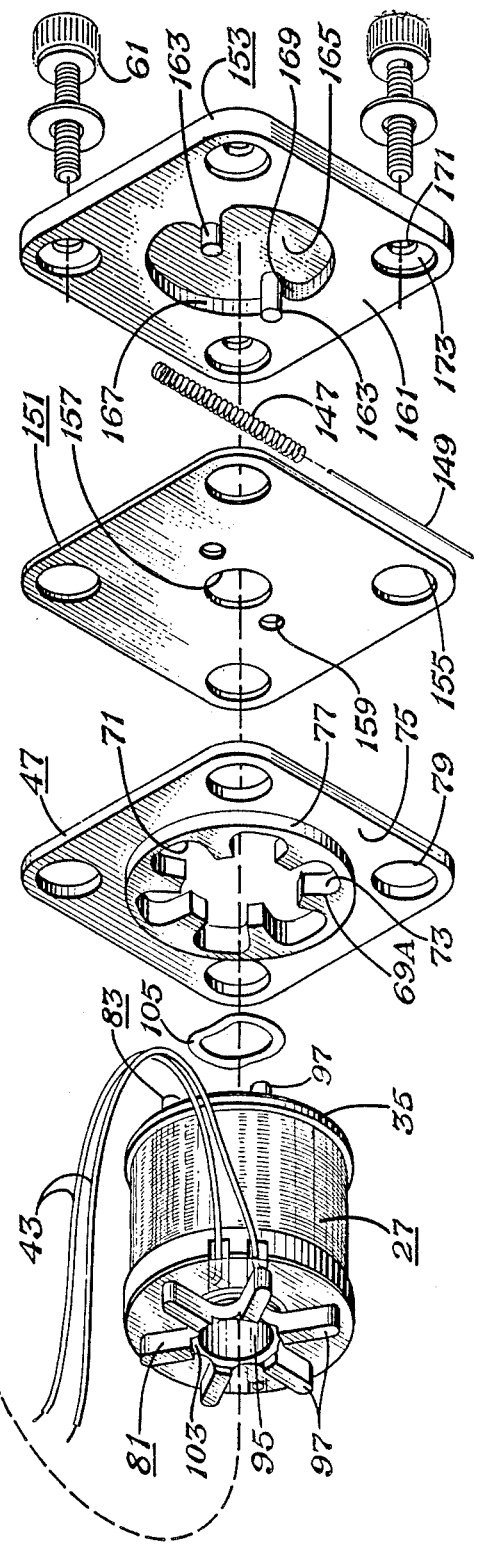

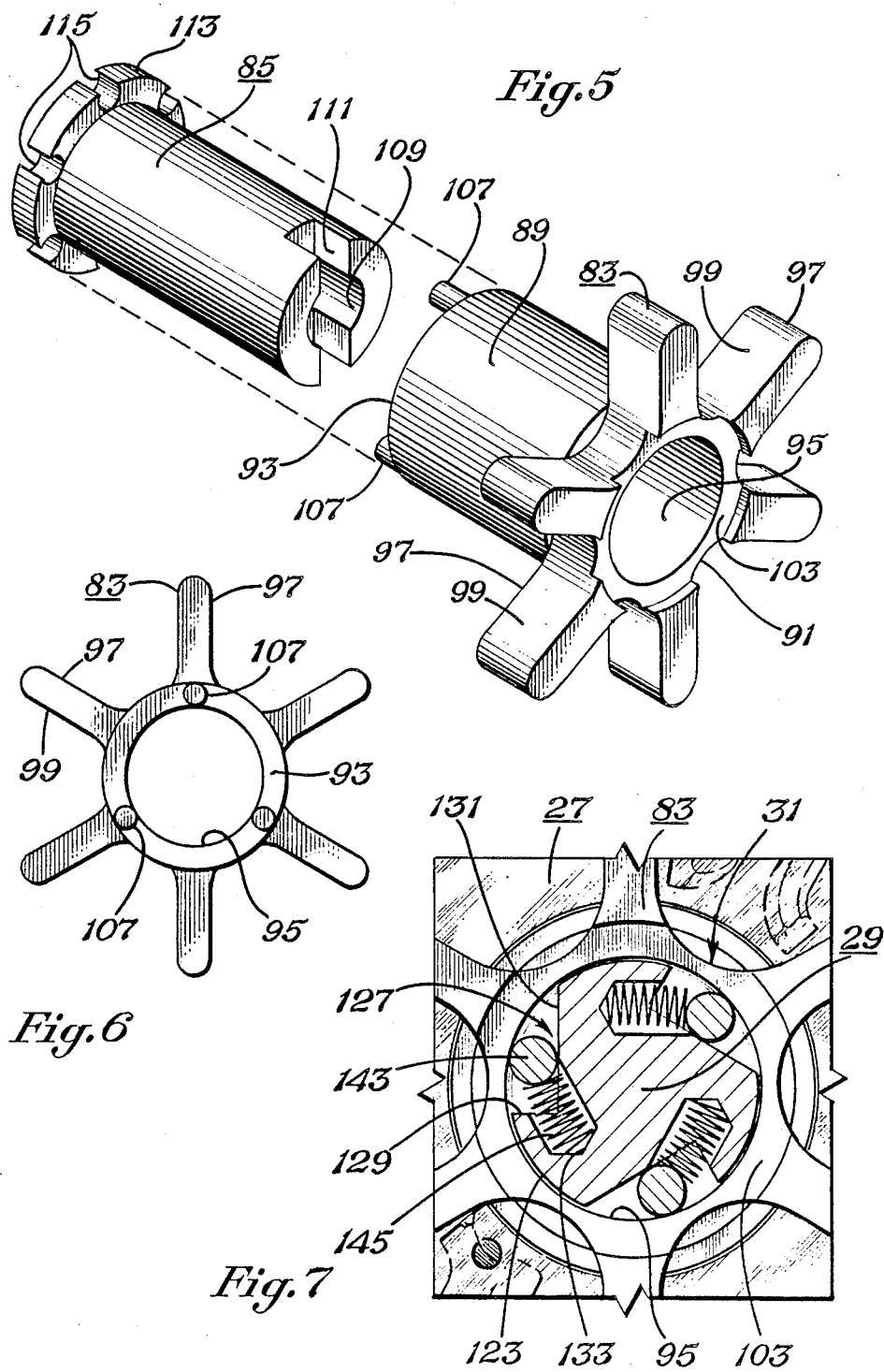

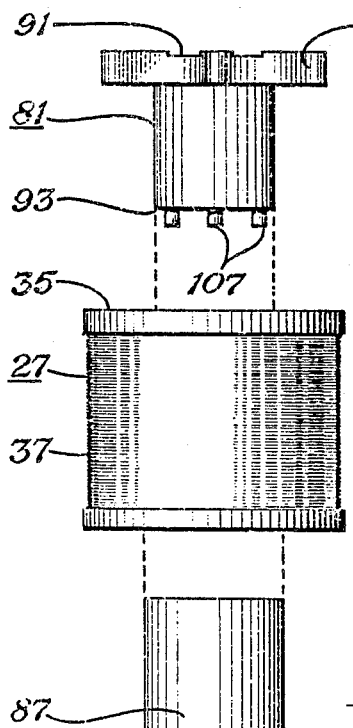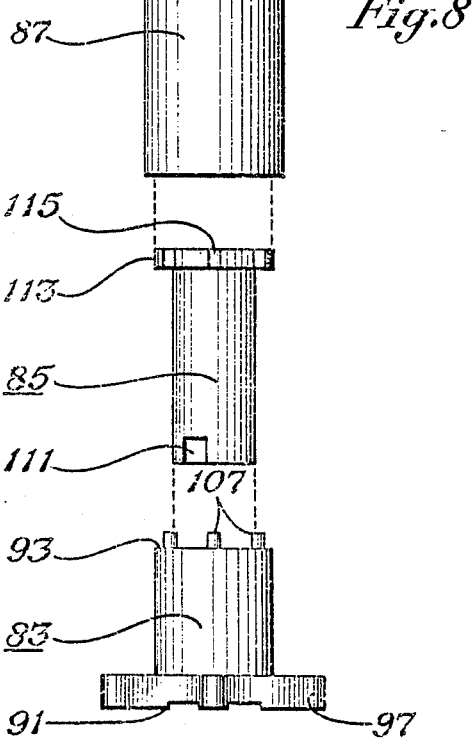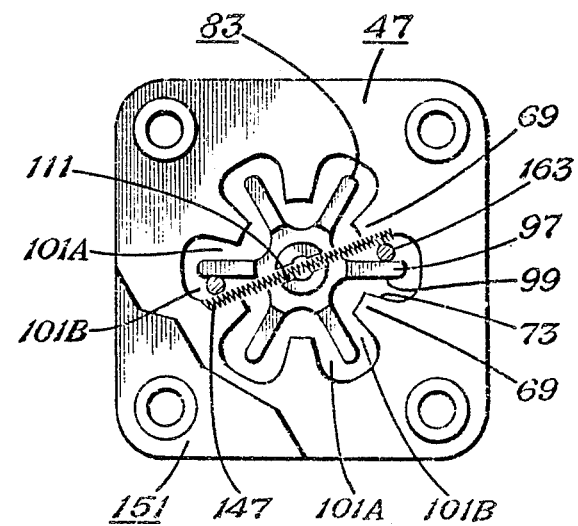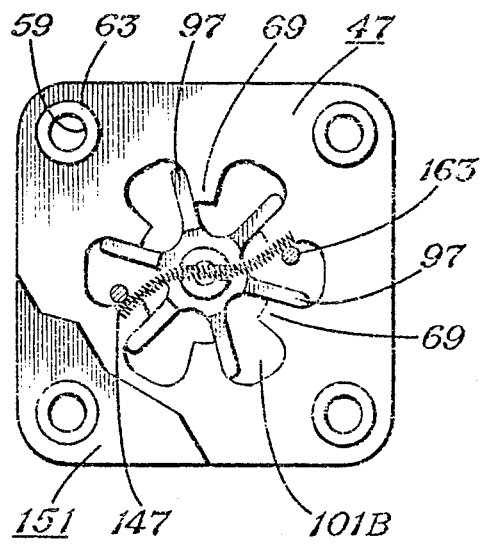
Fig. 8
Fig. 9
Fig. 10

SOLENOID

FIELD OF THE INVENTION

The present invention relates to solenoids for rotating shafts, such as can be used in conjunction with stepping switches.

BACKGROUND OF THE INVENTION

The oil industry uses core guns to take samples of the side wall of a borehole. The core guns, which are lowered downhole, have plural core cups that are individually fired radially outward into the borehole wall for obtaining samples. Each core cup is fitted with an ignitor and an explosive charge.

One core gun may contain as many as 24 core cups. The firing of each individual core cup is controlled from the surface through the use of a rotary stepping switch located downhole. The stepping switch steps through multiple positions, with each position providing electrical continuity to a respective core cup ignitor. The stepping switch is stepped from one position to the next by a solenoid, also located downhole. When the solenoid is energized by a signal from the surface, the solenoid causes the stepping switch to rotate to the next position wherein a new ignitor can be fired.

Prior art solenoids are subject to several disadvantages when used in a downhole environment. Because the shafts of prior are solenoids accelerate throughout their rotational movement, the shafts tend to over rotate and cause the switch to jump 2 or 3 positions, thereby missing some ignitors. Prior art solenoids overcome this overrotation by compensating with devices that break the shaft momentum and limit the amount of shaft rotation. These limit devices complicate the workings of the solenoid and add to the cost. Furthermore, there is some concern that these prior art solenoids will not operate satisfactorily in a downhole environment because vibration and shock from the detonation of the explosive charges could impair the function of the limit devices.

SUMMARY OF THE INVENTION

It is an object of the present invention to provide a solenoid having a rotatable shaft that will not overrotate when the coil is energized.

It is a further object of the present invention to provide a solenoid that has a rotatable shaft, the rotation of which is limited by the magnetic field of the solenoid.

The solenoid of the present invention includes a coil, an outer core means, an inner core means, a spring return means, a shaft, and drive means. The coil has conductive windings wrapped around a central opening. The central opening extends between first and second ends. The outer core means provides an outer magnetic circuit portion around the outer portion of the coil. The outer core means has plural poles, each of which are separated from the adjacent poles by gaps. The inner core means provides an inner magnetic circuit portion in the inner portion of the coil. The inner core means is located in the central opening of the core and includes rotor means. The rotor means is capable of turning relative to the coil. The rotor means has plural armatures located in the gaps between the poles such that each armature is between two of the poles. The rotor means is movable between a first position where there is an air gap between each of the armatures and the adjacent poles, and a second position where the armatures contact one of the respective adjacent poles. The rotor means moves from the first position to the second position when the coil is electrically energized. The spring return means returns the rotor means to the first position from the second position when the coil is deenergized. The shaft has an inner end and an outer end with the inner end being located within the central opening of the coil such that the shaft outer end protrudes out of the coil. The shaft outer end is adapted to be coupled to a load. The shaft is made of a material having a relatively high magnetic permeability. The drive means drives the shaft when the rotor means moves from the first position to the second position. The drive means couples the shaft to the rotor means when the rotor means moves from the first position to the second position and disengages and allows the shaft to remain stationary when the rotor means moves from the second position to the first position.

The solenoid of the present invention utilizes a shaft made of a material having a relatively high magnetic permeability, as are the outer and inner core means, wherein in the presence of a magnetic field the shaft becomes magnetically coupled to the rotor means. This magnetic coupling prevents overrotation of the shaft by stopping shaft rotation when the rotation of the rotor means ceases.

In one aspect, the poles and armatures project in radial directions. In another aspect, there are multiple poles and armatures, with the poles and armatures being located at each end of the coil. By using multiple poles and armatures, current requirements can be reduced.

BRIEF DESCRIPTION OF DRAWINGS

FIG. 4 is an exploded isometric view of the solenoid.

FIG. 5 is an isometric view of the bottom rotor and the coupling rotor.

FIG. 6 is an end view of one of the rotors.

FIG. 7 is a schematic cross-sectional view of the drive assembly, looking in from the bottom rotor.

FIG. 8 is an exploded side view showing the coil and inner core assembly.

FIG. 9 is a cut away schematic view of the bottom of the solenoid, showing the bottom rotor and return spring positions when the solenoid is deenergized.

FIG. 10 is a cut away schematic view of the bottom of the solenoid, showing the bottom rotor and return spring positions when the solenoid is energized.

DESCRIPTION OF PREFERRED EMBODIMENT

Figure 1:
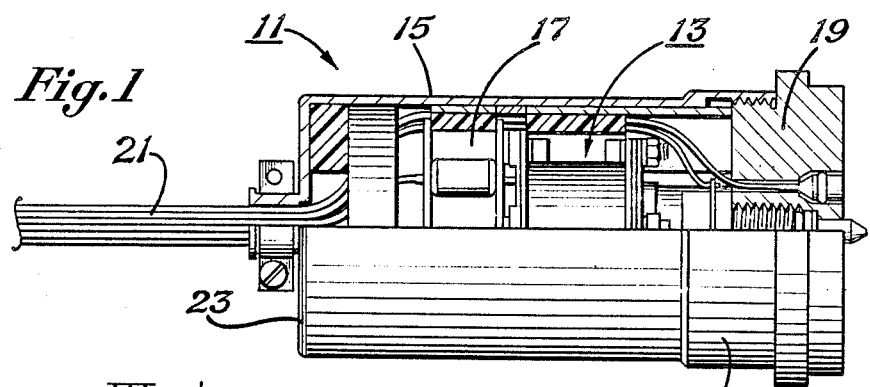
FIG. 1 is a partial cross-sectional view of an ignitor switch assembly for a core gun, incorporating the solenoid of the present invention, in accordance with a preferred embodiment.
Figure 2:
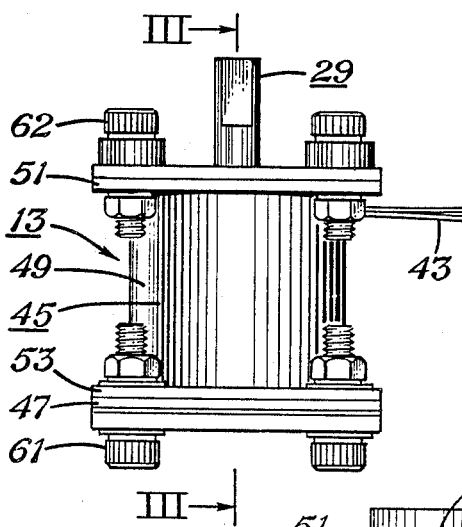
FIG. 2 is a side view of the solenoid.

In FIG. 1, there is shown a partial cross-sectional view of an ignitor switch 11 for a core gun (not shown), which switch assembly incorporates the solenoid 13 of the present invention, in accordance with a preferred embodiment. The ignitor switch assembly 11 is used to electrically ignite individual ignitors contained within the core gun. Although the solenoid 13 of the present invention (see FIG. 2) is described herein in conjunction with a rotary switch for use with a core gun, it can be used in other applications as well.

Core guns are used by the oil industry to obtain geological samples of the sides of uncased boreholes. A single core gun contains plural core cups. The core cups are individually actuated and are thrust radially outward into the borehole wall. Each core cup is propelled by the detonation of a respective explosive charge. Each explosive charge is provided with an ignitor, and each ignitor is actuated by the ignitor switch assembly 11 independently of the other ignitors. Such independent control over individual ignitors allows the correlation of the samples procured by the respective core guns with depth information. The ignitors, explosive charges, and core cups are contained within the core gun. Plural core guns stacked in a longitudinal manner are used to shorten logging time.

Figure 11:
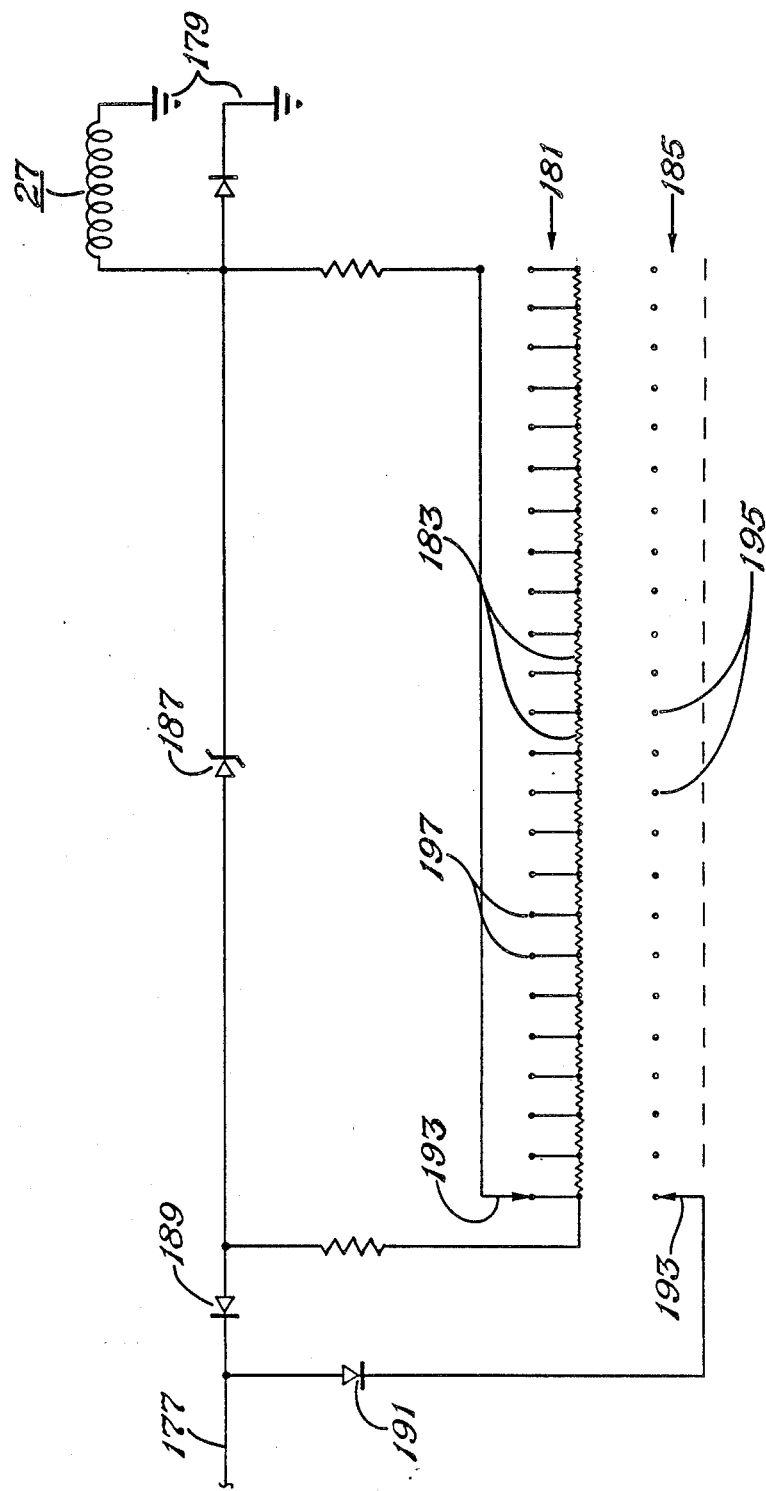
FIG. 11 is an electrical schematic diagram of the stepping switch.

The switch assembly 11 is used to ignite individual ignitors. The switch assembly 11 includes the solenoid 13, a switch assembly housing 15, a switch 17, a connector 19, and a cable 21. The switch 17 and the solenoid 13 are contained within the housing 15. The housing 15 has an upper end 23 and a lower end 25. The cable 21, which exits the housing 15 at the upper end 23, communicates with surface equipment (not shown). At the lower end 25 of the housing 15 is the connector 19, which interfaces with the upper end of a core gun. In the preferred embodiment, the switch 17 is a twenty-four position rotary stepping switch. Referring to FIG. 11, the switch 15 has a rotor portion 193 that is movable over twenty-four sets 195 of electrical contacts located in a circular configuration. At each position, the rotor portion 193 provides electrical continuity, via the respective set 195 of electrical contacts, with the respective ignitor assigned to that position, wherein the ignitor can be electrically actuated by a signal from the surface. The switch 15 also has mechanical resistance means for resisting movement of the rotor portion from one position to the next. The switch 15 and the solenoid 13 are mechanically coupled to each other wherein the solenoid produces rotary movement for switching the switch, and in particular the rotor portion of the switch, to the next position.

Figure 3:
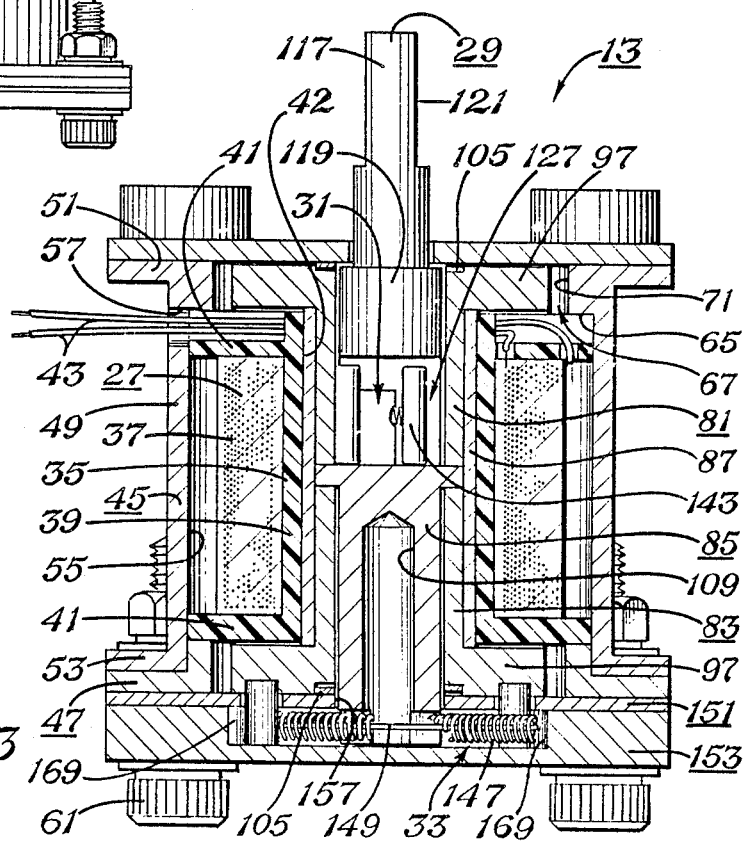
FIG. 3 is an enlarged schematic cross-sectional view of the solenoid, taken at lines III—III of FIG. 2.

Referring to FIG. 3, the solenoid includes a coil 27, an outer core assembly, an inner core assembly, a shaft 29, a drive assembly 31, and a spring return assembly 33. In describing the solenoid of the present invention, the terms "upper" and "lower" will be used with reference to the orientation of the solenoid shown in FIGS. 2 and 3. In FIG. 4, the "upper" end of the solenoid is shown in the upper left portion of the drawing, while the "lower" end is shown in the lower right portion of the drawing.

Referring to FIGS. 3 and 4, the coil 27 includes a bobbin 35 and windings 37. The bobbin 35 has a cylindrical portion 39 with radially extending flanges 41 at each end of the cylindrical portion. A cylindrical bore 42 extends through the bobbin 35 between the ends of the cylindrical portion 39. The flange 41 and the outer surface of the cylindrical portion 39 form a channel for receiving the windings 37. The windings 37 are made of electrical wire wound around the bobbin cylindrical portion 39. The ends of the wire are connected to two lead wires 43 that provide the necessary energization current. The gauge of wire used and the number of turns around the cylindrical portion are determined by the amount of torque required from the solenoid.

The outer core assembly includes a solenoid housing 45 and an end plate 47. The solenoid housing 45 has a cylindrical portion 49 with radially extending upper and lower flanges 51, 53 at the ends of the cylindrical portion. The cylindrical portion 49 has a central opening 55 extending between the two flanges. The central opening 55 is sized so as to receive the coil 27. The cylindrical portion 49 of the solenoid housing 45 has openings 57 for receiving the two lead wires 43 that connect the coil 27 to a power supply. The upper and lower flanges 51, 53 have openings 59 for receiving threaded fasteners 61. The lower flange 53 has cylindrical bosses 63 aligned with the respective openings 59, such that the openings extend through the bosses. The bosses 63, which are used for the alignment of other components, extend in a direction opposite from the upper flange 51.

The solenoid housing has a pole portion 65 located inside of the central opening 55 at the upper end of the solenoid housing. The pole portion 65 has plural poles 69 that extend radially inward. The pole portion 65 has an opening 67 that is aligned with the central opening 55 of the cylindrical portion 49. The poles 69 extend inwardly from the perimeter of the opening 67. The poles 69 are substantially similar in size and shape to each other and are spaced equidistantly around the opening perimeter. Each pole is separated from the adjacent poles by respective air gaps 71. Each pole 69 has an approximate trapezoidal shape, with the inner end of the poles circumscribing a small arc and the outer portion of the poles circumscribing a larger arc. Thus, the air gaps 71 in between the poles 69 have a cloverleaf shape. Each pole 69 has two lateral surfaces 73, which are planar near the pole inner ends. The upper surface of the pole portion is coplanar with the upper surface of the upper flange 51. The distance between the upper and lower surfaces the pole portion 65 is greater than the distance between the upper and lower surfaces of the upper flange 51. The pole portion 65 and the upper flange 51 are integral to the cylindrical portion 49.

The end plate 47 includes a plate 75 and an integral pole portion 77 that is similar to the pole portion 65 of the solenoid housing 45. The pole portion 77 is thicker than the plate 75 so that when the end plate 47 is assembled onto the lower flange 53 of the solenoid housing 45, the pole portion 77 extends into the central opening 55. The corners of the end plate 47 have openings 79 for receiving the bosses 63 of the solenoid housing lower flange 53.

The inner core assembly includes upper and lower rotors 81, 83, a coupling rotor 85, and a sleeve 87. The upper and lower rotors 81, 83 are substantially similar to each other. Referring to FIGS. 5 and 6 where just the bottom rotor 83 is shown, each rotor has a cylindrical portion 89 with first and second ends 91, 93. The cylindrical portion 89 is tubular with a central opening 95 extending therethrough. The first end 91 has plural armatures 97 that project radially outward. Each rotor 81, 83 has the same number of armatures 97 as there are poles 69 in each pole portion 65, 75. In the preferred embodiment, there are six poles in each pole portion and six armatures on each rotor. The armatures 97 are spaced equidistantly apart. Each armature 97 has two lateral surfaces 99 which are planar near the armature outer ends for contacting the respective lateral surfaces 73 of the poles. The areal dimensions of the lateral surfaces 99 of the armatures are about the same as the areal dimensions of the lateral surfaces 73 of the poles. Each armature 97 is received by one of the gaps 71 between two poles 69 (see FIG. 9). Each armature 97 is sized so that when an armature is centered in its respective gap 71, there are air gaps 101A, 101B between the armature and each of the adjacent poles. Each rotor 81, 83 has a shallow counterbore 103 in its first end 91, for receiving a spring washer 105. The second end 93 of each rotor 81, 83 has three pins 107 projecting longitudinally outward. The pins 107, which are spaced 120 degrees apart from each other, are longitudinally aligned with a respective armature 97 (see FIG. 6).

The coupling rotor 85 couples the upper and lower rotors 81, 83 together so that the rotors turn together in unison. The coupling rotor 85 is generally cylindrical with a central cavity 109 that is open at the lower end. The outside diameter of the coupling rotor 85 is such that the coupling rotor is matingly received by the central opening 95 of the lower rotor 83. The lower end is bifurcated by a slot 111 for receiving portions of the spring return assembly 33. The upper end has a radially extending circular flange 113, which flange has planar upper and lower surfaces. The flange 113 has six notches 115 formed in its edge. The notches 115, which are equally space apart, matingly receive the pins 107 on the rotors with the three pins 107 of one rotor being located in a set of three notches 115 of the flange 113 and the three pins 107 of the other rotor being located in a different set of three notches 115 of the flange 113. The length of the coupling rotor 85 is such that when the coupling rotor is received by the central opening 95 of the lower rotor 83, with the pins 107 of the lower rotor being received by the notches 115 f the coupling rotor, the lower end of the coupling rotor protrudes out of the lower rotor so that the slot 111 is exposed.

The sleeve 87 is tubular with an outside diameter to matingly fit within the central opening 42 of the coil 27 and with an inside diameter to matingly receive the cylindrical portions 89 of the rotors 81, 83.

The shaft 29 has a first cylindrical portion 117 and a second cylindrical portion 119. At the upper end of the first cylindrical portion 117 are two diametrically opposed flat surfaces 121 for lockingly engaging the rotor portion (not shown) of the stepping switch 17. The second cylindrical position 119 has a cylindrical surface 123 with an outside diameter that provides a mating fit between the shaft second cylindrical portion and the central opening 95 of the upper rotor 81. The cylindrical surface 123 merges with a shoulder 125 which in turn merges with the cylindrical surface of the first cylindrical portion 117. The second cylindrical portion 119 has three cavities 127 in its lower end portion. The cavities 127 are spaced equidistantly apart from each other (see also FIG. 7). Each cavity 127 is formed by first and second planar surfaces 129, 131 which first and second planar surfaces are perpendicular to each other. The first and second planar surfaces 129, 131 are parallel to the longitudinal axis of the shaft 29. Looking in transverse cross-section of the shaft 29 (see FIG. 7), an obtuse angle is formed between the first planar surface 129 and a first tangent of the cylindrical surface 123, which first tangent is located at the intersection of the cylindrical surface and the first planar surface. An acute angle is formed between the second planar surface 131 and a second tangent of the cylindrical surface 123, which second tangent is located at the intersection of the cylindrical surface and the second planar surface. Thus, each cavity has a deep portion, which is near the first planar surface 129, and a shallow portion which is near the intersection of the second planar surface 131 and the cylindrical surface 123. Each cavity 127 has a cylindrical borehole 133 extending into the shaft 29 and located at the juncture of the first and second planar surfaces 129, 131. The shaft 29 has a flat bottomed surface 135.

A rectangular spacer plate 137 is also provided. The spacer plate 137 has a central opening 139 for receiving the first cylindrical portion 117 of the shaft 29, and also has openings 141 at its corners for receiving threaded fasteners 62.

The drive assembly 31 includes roller pins 143 and springs 145 (see FIGS. 3, 4, and 7). A spring 145 is received by each of the boreholes 133 in the shaft cavities 127. A portion of each spring 145 protrudes into the respective cavity. The roller pins 143 are small cylinders adapted to be located in the shaft cavities 127. The diameter of the roller pins 143 is such that the shaft 29, when fitted with the roller pins, can be inserted into the central opening 95 of the upper rotor 81. With the shaft assembled into the upper rotor central opening 95, the springs 145 are compressed by the roller pins 143. The springs 145 force the roller pins to bear on the second planar surface 131 and the interior surface of the rotor 81 formed by the central opening 95.

The spring return assembly 33 includes a spring 147, a length of spring-like wire 149, a support plate 151, and a stop plate 153. In the preferred embodiment, the spring 147 is an extension spring. The wire 149 is of a length that is substantially similar to the length of the spring 147. The wire 149 is of a diameter that is much less than the inside diameter of the spring 147. In the preferred embodiment, the wire 149 is made of INCONEL alloy. The flat support plate 151 is generally square having openings 155 at the corners for receiving the bosses 63 of the solenoid housing lower flange 53. The support plate 151 also has a central opening 157 for receiving the lower end of the coupling rotor 85. The support plate has two small projection openings 159 that are diametrically opposed from each other. The projection openings 159 are positioned to receive the projections 163 of the stop plate 153.

The stop plate 153 has an upper surface 161 that abuts against the support plate 151, when the solenoid is assembled. The upper surface 161 has two cylindrical projections 163 that are located so as be diametrically opposed to each other. The projections 163 are of a length such that when the stop plate 153 is assembled onto the support and end plates 151, 47, the projections extend into two of the gaps 71 of the end plate pole portion 77. The diameter of each projection 163 is such that the projection is located in the air gap 101B between the respective armature 97 and one of the adjacent poles 69, while allowing an air gap 101A between the respective armature and the other of the adjacent poles (see FIG. 9). The stop plate 153 has formed in its upper surface 151 a shallow circular cavity 165. The diameter of the cavity 165 is slightly greater than the length of the spring 147. The projections 163 are located within the perimeter of the cavity 165 so that the distance between the projections is less than the length of the spring 147. The cavity 165 has a side wall 167 that merges with the projections 163 to form respective stop surfaces 169. The stop plate 153 also has openings 171 for receiving the threaded fasteners 61. The openings 171 have counterbores 173 for receiving the bosses 63 of the solenoid housing lower flange 53.

The shaft 29, the solenoid housing 45, the end plate 47, the and lower rotors 81, 83, the coupling rotor 87, and the sleeve 85 are all made of a material ha a relatively high magnetic permeability, which is capable of providing a good magnetic circuit. In the preferred embodiment, the above components are made of cold rolled steel. The bobbin 35 is made of an electrical insulating plastic.

The solenoid of the present invention can be assembled in the following manner. First, the coil 27 and the inner core assembly are assembled together. Referring to FIGS. 3 and 8, the sleeve 87 is inserted into the bore 42 of the coil bobbin 35. The second end 93 of the upper rotor 81 is inserted into one end of the sleeve 87 until the armatures 97 contact the end of the sleeve. Then, the coupling rotor 85 is inserted into the other end of the sleeve 87 such that the flange 113 contacts the second end 93 of the upper rotor 81 and the pins 107 of the upper rotor are received by the coupling rotor notches 115. The second end 93 of the lower rotor 83 is inserted into the annulus between the sleeve 87 and the coupling rotor 85, until the second end contacts the flange 113 and the pins 107 of the lower rotor are received by the remaining notches 115 in the coupling rotor.

Next, the second cylindrical portion 119 of the shaft 29 is inserted into the central opening 95 of the upper rotor 81. The springs 145 are installed into the respective boreholes 133 in the shaft and the roller pins 143 are located in the respective cavities 127 of the shaft. The shaft 29 is pushed into the upper rotor central opening 95 until the bottom surface 135 of the shaft contacts the coupling rotor 85. With the shaft 29 installed in the coil 27 and the inner core assembly, the first cylindrical portion 117 of the shaft protrudes out from the coil.

The coil 27, the shaft 29, and the inner core assembly are inserted into the central opening 55 of the solenoid housing 45. The armatures 97 of the upper rotor 81 are located in the gaps 71 between the respective poles 69 (see FIG. 9, which shows the bottom rotor 83). The lead wires 43 exit the solenoid housing 45 through the openings 57.

Next, one of the spring washers 105 is located in the counterbore 103 of the upper rotor 103. The spacer plate 137 is assembled onto the upper flange 51 of the solenoid housing 45, such that the first cylindrical portion 117 of the shaft 29 protrudes through the opening 139 of the spacer plate. The spacer plate 137 is retained onto the solenoid housing by threaded fasteners 62 (see FIG. 2) extending through the spacer plate openings 141 and the upper flange openings 59. The diameter of the opening 139 of the spacer plate is smaller than the diameter of the second cylindrical portion 119 of the shaft, wherein the shaft is retained inside of the solenoid housing 45.

The end plate 47 is assembled onto the lower flange 53 of the solenoid housing 45, such that the pole portion 77 extends into the central opening 55 of the solenoid housing and the armatures 97 of the lower rotor 83 are located in the gaps 71 between the respective poles 69 (see FIG. 9). The poles of the end plate 47 should be longitudinally aligned with the poles of the solenoid housing 45. The openings 79 receive the bosses 63. The other of the spring washers 105 is located in the counterbore 103 of the lower rotor 83. Then, the support plate 151 is assembled onto the end 47 such that the openings 155 receive the bosses 63, and the lower end (with the slot 111) of the coupling rotor 85 protrudes out through the opening 157. Then, the wire 149 is inserted into the spring 147, and the spring is inserted into the coupling rotor slot 111 (see FIG. 9). The stop plate 153 is assembled onto the support plate 151 such that the projections 163 are inserted through the support plate openings 159 and the spring 147 is located inside of the cavity 165 adjacent to the respective projection stop surfaces 169. The bosses 63 are received by the counterbores 173 in the stop plate 153. Threaded fasteners 61 are inserted through the stop plate openings 171 and the solenoid housing lower flange openings 59.

The first cylindrical portion 117 of the shaft is coupled to the rotor portion of the switch 17.

The operation of the solenoid 13 of the present invention will now be described. In this description, reference to clockwise and counterclockwise directions are made with respect to the views shown in FIGS. 7, 9, and 10. The upper and lower rotors 81, 83 rotate between a deenergized position (see FIG. 9) and an energized position (see FIG. 10).

Referring to FIG. 9, where the rotors are shown in the deenergized position, the coil is deenergized and air gaps 101A, 101B separate the respective armatures 97 of the rotors 81, 83 from the respective adjacent poles 69. Thus, the armatures 97 are not in contact with any of the poles 69. The projections 163 extend into respective air gaps 101B between the armatures 97 and the poles 69. The projections 163 are positioned, when looking at the solenoid from its bottom end as shown in FIG. 9, so as to allow clockwise rotation of the armatures from the deenergized position, but prohibit counterclockwise rotation of the armatures from the deenergized position. Although not shown, the diameter of each projection 163 is such that the armatures are positioned closer to one of the adjacent poles than to the other of the adjacent poles. Unequal air gaps are thus formed, with a smaller air gap 101A formed between each of the armatures and the respective pole located in a clockwise direction from the armature. A larger air gap 101B is formed between each of the armatures and the respective pole located in a counterclockwise direction from the armature. This unevenness of air gap size around each armature insures that the armatures will always rotate in a clockwise direction when the coil is energized. The slot 111 of the coupling rotor 85 is oriented with respect to the projections 163 such that the spring 147 is adjacent to a stop surface 169 (in FIGS. 9 and 10 the stop surfaces are not shown; for simplicity the ends of the spring 147 are shown as being adjacent to the projections 163) on the side of each projection, and the spring is in an undeformed or relaxed state. As the rotors 81, s3 and the coupling rotor 85 rotate clockwise from the deenergized position, the ends of the spring 147 contact the respective stop surfaces 169 and deform or bend.

To rotate the shaft 29, and thus move the switch 17 to the next position, the coil 27 is energized with direct current for a short period of time. The outer core assembly, which includes the solenoid housing 45 and the end plate 47, and the inner core assembly, which includes the upper and lower rotors 81, 83, the coupling rotor 85, and the sleeve 87, provide a path or magnetic circuit for the magnetic field produced by the energized coil 27. The armatures 97 of the rotors 81, 83 are pulled across the air gaps 101A towards the poles in a clockwise direction, resulting in clockwise rotation of the rotors 81,83. Referring to FIG. 10, the small air gaps 101A close as the lateral surfaces 99 of the armatures contact the lateral surfaces 73 of the poles. The upper and lower rotors 81, 83 and the coupling rotor rotate in unison because they are rotationally coupled together.

As the rotors turn in a clockwise direction, the shaft 29 rotates in unison with the rotors, because the drive assembly 31 engages and rotationally couples the shaft to the upper rotor. Referring to FIG. 7 (which shows the bottom rotor 83 and a cross-section of the drive assembly 31; the upper rotor, which contains the drive assembly, is not shown in the figure although the central openings 95 of the upper and lower rotors 81, 83 are concentric with each other), the drive assembly 31 prevents counterclockwise rotation of the shaft 29 relative to the rotors (or clockwise rotation of the rotors relative to the shaft), but permits clockwise rotation of the shaft relative to the rotors (or counterclockwise rotation of the rotors relative to the shaft). Relative counterclockwise rotation of the shaft to the rotors is prevented by the roller pins 143, which are positioned in the shaft cavities 127, and which are wedged in between the respective second planar surface 131 and the respective inner surface of the rotor central opening 95 by the springs 145. The second planar surface 131 and the inner surface of the rotor central opening 95 converge as the cavity is traversed away from the borehole 133, thus narrowing the cavity 127 to a dimension smaller than the diameter of the respective roller pin 143. The respective springs 145 force the roller pins into the converging second planar surface and central opening inner surface. Relative clockwise rotation of the shaft to the rotors is permitted because the roller pins 143 are forced closer to the first planar surface 129 by the relative movement, compressing the springs 145 and positioning the roller pins in a respective portion of the cavities that is of a larger dimension than the diameter of the roller pins.

The rotating shaft 29 rotates the rotor portion inside of the switch 17 to the next position. Prior art solenoids have encountered problems with the momentum of the shaft, which causes the switch to rotate two or three positions, instead of the desired one position. The solenoid 13 of the present invention limits rotation of the shaft to a single switch position by using a shaft 29 made of a magnetizable material; that is, a material that has a relatively high permeability. The inner and outer core assemblies are made of a magnetizable material to provide a good path for the magnetic field. The magnetizable shaft 29 thus becomes part of the magnetic circuit that is established when the coil is energized. Upon energization of the coil 27, the shaft 29 becomes magnetically coupled to the rotors 81, 83, and to the coupling rotor 85 so that the shaft effectively stops its rotation in unison with the rotors. The magnetic coupling causes the shaft to abruptly deaccelerate when the rotors stop rotation. The rotors 81, 83 and their armatures 97 are limited in movement by the poles 69; the rotors rotate to close the air gaps 101A. Any further clockwise rotation of the rotors is prevented by the poles. Any further clockwise rotation of the shaft is prevented by the shaft being magnetically coupled to the rotors.

As the rotors and coupling rotor are rotated clockwise from the deenergized position to the energized position, the coupling rotor slot 111 rotates, deforming the spring 147 and the wire 149. The ends of the spring and of the wire are prevented from rotating by the projections 163 and their stop surfaces 169.

After the rotors 81, 83 have rotated to their energized positions, the coil 27 is deenergized to reset the solenoid. Upon deenergization in the coil 27, the magnetic field collapses and the magnetic attraction between the poles 69 and the armatures 97 ceases. The deformed spring 147 exerts counterclockwise rotational force on the rotors 81, 83 and causes the rotors to move in a counterclockwise direction, back to the deenergized position (see FIG. 9). With the rotors in the deenergized position, the spring 147 is in a relatively undeformed state.

The wire 149, which is located inside of the spring 147, provides additional counterclockwise force to assist the spring in returning the rotors to the deenergized position. Because the wire 149 is of a smaller diameter than the inside diameter of the spring 147, for slight deformations of the spring the wire is not deformed. For larger deformations of the spring however, the wire becomes deformed. Thus, the wire provides additional counterclockwise force on the rotors to break the connection between the armatures 97 and the poles 69. As the rotors near the deenergized position, the rotational force of the wire on the rotors ceases before the spring is fully relaxed.

As the rotors are rotated counterclockwise by the spring 147, the rotor portion of the switch 17 holds the shaft 29 stationary in its new angular position. The rotor portion of the switch is itself held stationary by the mechanical resistance means inside of the switch. The drive assembly 31, which allows clockwise rotation of the shaft relative to the rotors (and thus counterclockwise rotation of the rotors relative to the shaft), permits the rotors to rotate counterclockwise while the shaft remains stationary. The rotor portion of the switch is therefore rotated only in the clockwise direction. With the rotors in the deenergized position, the solenoid is reset and ready for the next pulse of current.

The solenoid 13, and in particular the coil 27, is energized by current from surface equipment sent downhole via the switch 17. A single wire and a common ground are used to energize the coil 27 to rotate the switch 17 to the next position, and to fire the respective ignitor. Differentiation of the signals occurs by using signals of opposite polarity. In FIG. 11, there is shown an electrical schematic diagram of the switch 17 and of the solenoid coil 27. The switch has a common input wire 177, from the surface equipment, and a common ground 179. The solenoid coil 7 is connected to the input wire 177 through isolation diodes 187, 189 and is also connected to the common ground 179. The input wire 177 is connected, through isolation diodes 189, 191, to two decks of electrical contact sets. The first deck 181 includes series connected resistors 183, all having equal values. The electrical contacts 197 are connected between the resistors. The first deck 181 allows the surface to sense what particular position the switch 17 is in, by sensing the total resistance. The second deck 185 of electrical contact sets 195 provide electrical continuity to the core gun ignitors with the rotor portion 193.

To rotate the switch to the next position, a pulse of direct current is applied to the input wire 177 and to the common ground 179. A positive voltage is applied to the common ground 179 and a negative voltage is applied to the input wire 177. Current flows through the solenoid coil 27 and the diodes 187, 189. The duration of the pulse is long enough to ensure that the rotors 81, 83 reach the energized position. To actuate the ignitor, a positive voltage is applied to the input wire 177 and a negative voltage is applied to the common ground 179. Current flows through the diode 191 contacts of the rotor portion 193, and into the ignitor.

The rotation angle that the shaft rotates through when the coil is energized is determined, to a certain extent, by the air gap 101A. The size of the air gap 101A reflects the rotational angle.

It is believed that the use of multiple poles and armatures assist in reducing current requirements in energizing the coil.

The foregoing disclosure and the showings made in the drawings are merely illustrative of the principles of this invention and are not to be interpreted in a limiting sense.

We claim:

1. A solenoid, comprising:
   (a) a coil having conductive windings wrapped around a central opening, said central opening extending between first and second ends, said coil having inner and outer portions with said central opening extending through said inner portion;
   (b) outer core means for providing an outer magnetic circuit portion on the outer portion of said coil, said outer core means having plural poles, each of said poles being separated from the adjacent poles by gaps;
   (c) inner core means for providing an inner magnetic circuit portion in the inner portion of said coil, said inner core means being located within said coil central opening, said inner core means comprising rotor means;
   (d) said rotor means being capable of turning relative to said coil, said rotor means having plural armatures located in said gaps between said poles such that each armature is between two of said poles, said rotor means being movable between a first position where there is an air gap between each of said armatures and said adjacent poles, and a second position where said armatures contact one of said respective adjacent poles, said rotor means moving from the first position to the second position when said coil is electrically energized;
   (e) spring return means for returning said rotor means to the first position from the second position when said coil is deenergized;
   (f) a shaft having an inner end and an outer end, said shaft inner end being located within said coil central opening such that said shaft outer end protrudes out of said coil, said shaft outer end being adapted to be coupled to a load;
   (g) said shaft being made of a material with a relatively high magnetic permeability;
   (h) drive means for driving said shaft when said rotor means moves from the first position to the second position, said drive means coupling said shaft to said rotor means when said rotor means moves from the first position to the second position, said drive means disengaging and allowing said shaft to remain stationary when said rotor means moves from the second position to the first position.

2. The solenoid of claim 1 wherein said poles and said armatures project in radial directions.

3. The solenoid of claim 2 wherein said outer core means poles are located adjacent to said coil first and second ends and said rotor means armatures are located adjacent to said coil first and second ends.

4. The solenoid of claim 2 wherein said rotor means has an interior cavity for receiving said shaft inner end, said rotor means interior cavity having an inner surface, said drive means coupling said shaft to said rotor means by engaging said inner surface.

5. The solenoid of claim 3 wherein said rotor means has an interior cavity for receiving said shaft inner end, said rotor means interior cavity having an inner surface, said drive means coupling said shaft to said rotor means by engaging said inner surface.

6. The solenoid of claim 4 wherein said drive means comprises:
   (a) plural cylindrical members, each of said cylindrical members being received by respective cavities located between said shaft inner end portion and said rotor means inner surface such that said cylindrical members are longitudinally oriented with respect to said shaft, each of said cavities having a narrow portion which is sized so as to be unable to receive said respective cylindrical member;
   (b) plural springs for forcing said respective cylindrical members towards said cavity narrow portions.

7. The solenoid of claim 5 wherein said drive means comprises:
   (a) plural cylindrical members, each of said cylindrical members being received by respective cavities located between said shaft inner end portion and said rotor means inner surface such that said cylindrical members are longitudinally oriented with respect to said shaft, each of said cavities having a narrow portion which is sized so as to be unable to receive said respective cylindrical member;
   (b) plural springs for forcing said respective cylindrical members towards said cavity narrow portions.

8. The solenoid of claim 1 wherein said spring return means comprises an extension spring having two ends and a central portion, said central portion coupled to said rotor means so as to turn with said rotor means.

9. The solenoid of claim 3 wherein said spring return means comprises an extension spring having two ends and a central portion, said central portion coupled to said rotor means so as to turn with said rotor means.

10. The solenoid of claim 7 wherein said spring return means comprises an extension spring having two ends and a central portion, said central portion coupled to said rotor means so as to turn with said rotor means.

11. The solenoid of claim 8 wherein said spring ends are located adjacent to stop means for stopping the movement of said spring ends, said stop means positioned such that when said rotor means is in the first position said spring is relaxed and when said rotor means is in the second position said spring is deformed, said stop means extending into at least one of said air gaps to prevent rotation of said rotor means beyond the first position.

12. The solenoid of claim 11 wherein said spring return means further comprises a length of stiff wire located within said spring, said wire being of smaller diameter than the inside diameter of said spring and having a length that is similar to the length of said spring.

13. The solenoid of claim 8 wherein said spring return means further comprises a length of stiff wire located within said spring, said wire being of smaller diameter than the inside diameter of said spring and having a length that is similar to the length of said spring 14. The solenoid of claim 10 wherein:
   (a) said spring ends are located adjacent to stop means for stopping the movement of said spring ends, said stop means positioned such that when said rotor means is in &:he first position said spring is straight and when said rotor means is in the second position said spring is deformed, said stop means extending into said adjacent gaps to prevent rotation of said rotor means beyond the first position;

(b) said spring return means further comprises a length of stiff wire located within said spring, said wire being of smaller diameter than the inside diameter of said spring and having a length that is similar to the length of said spring.

15. A solenoid, comprising:
(a) a coil having conductive windings wrapped around a central opening, said central opening extending between first and second ends, said coil having inner and outer portions with said central opening extending through said inner portion;
(b) outer core means for providing an outer magnetic circuit portion on the outer portion of said coil, said outer core means having plural poles adjacent to each of said first and second coil ends, each of said poles being separated from the adjacent poles by gaps;
(c) inner core means for providing an inner magnetic circuit portion in the inner portion of said coil, said core inner means being located within said coil central opening, said core inner means comprising first and second rotor means respectively located at said coil first and second ends;
(d) said first and second rotor means being rotationally coupled together and being capable of turning relative to said coil, said first and second rotor means each having plural armatures located in said gaps between said respective poles such that each armature is between two of said poles, said first and second rotor means being movable between a first position where there is an air gap between each of said armatures and said adjacent poles, and a second position where said armatures contact one of said respective adjacent poles, said first and second rotor means moving from the first position to the second position when said coil is electrically energized, said first rotor means having a cavity;
(e) a shaft having an inner end and an outer end, said shaft inner end being located within said first rotor cavity, said outer end protruding out of said coil and being adapted to be coupled to rotary switch means, said shaft inner end having plural cavities for receiving respective roller pins, each of said cavities having a narrow portion which is sized so as to be unable to receive said respective roller pins, each of said cavities having a borehole for receiving a spring for forcing said roller pins into the narrow portion of said cavities, said roller pins contacting said shaft and said first rotor when said shaft is located in said first rotor cavity;
(f) said shaft being made of a material with a relatively high magnetic permeability so as to become magnetically coupled to said first and second rotors;
(g) projection means projecting into said gaps between said poles at said coil second end so as to prevent armature movement beyond the first position from the second position, said projection means having stop surfaces;
(h) said inner core means having slot means for receiving spring means, said spring means having ends which are located adjacent to said stop surfaces on said projection means, said spring means being aligned so as to be undeformed when said first and second rotors are in the first position and being deformed when the first and second rotors are in the second position.

* * * * *